US009415423B2

(12) United States Patent
Wilson

(10) Patent No.: US 9,415,423 B2
(45) Date of Patent: Aug. 16, 2016

(54) MODIFIED RADIX SORT SYSTEM

(75) Inventor: Eric S. Wilson, Mansfield, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 1052 days.

(21) Appl. No.: 13/274,860

(22) Filed: Oct. 17, 2011

(65) Prior Publication Data

US 2012/0095591 A1 Apr. 19, 2012

Related U.S. Application Data

(60) Provisional application No. 61/393,535, filed on Oct. 15, 2010.

(51) Int. Cl.
*G06F 7/00* (2006.01)
*B07C 3/08* (2006.01)

(52) U.S. Cl.
CPC ........................................ *B07C 3/08* (2013.01)

(58) Field of Classification Search
USPC .................................. 700/223, 224; 209/584
See application file for complete search history.

(56) References Cited

U.S. PATENT DOCUMENTS 7,669,706 B2 * 3/2010 McLaughlin et al. ........ 198/349
2007/0131593 A1 * 6/2007 Burns et al. ................... 209/584
2008/0290005 A1 * 11/2008 Bennett et al. ................ 209/584

* cited by examiner

*Primary Examiner* — Yolanda Cumbess

(57) ABSTRACT

System, methods, and computer-readable media. A method performed by a mail sorter includes receiving a plurality of mailpieces in an input of the sorter. The method includes performing a buffered sort process by transporting the mailpieces along a plurality of transport lanes, each transport lane having an output tray and a buffer, from the input to respective buffers and output trays on the transport lanes, but not transporting mailpieces from the input to an output tray on a selected transport lane. The method includes transporting mailpieces from the buffer to the output tray on the selected transport lane during the buffered sort process. The method includes selecting a new selected transport lane of the plurality of transport lanes. The method includes repeating the buffered sort process and the transporting mailpieces from the buffer to the output tray on the selected transport lane.

20 Claims, 9 Drawing Sheets

MODIFIED RADIX SORT SYSTEM

CROSS-REFERENCE TO OTHER APPLICATIONS

This application claims the benefit of the filing date of U.S. Provisional Patent Application 61/393,535, filed Oct. 15, 2010, which is hereby incorporated by reference.

TECHNICAL FIELD

The present disclosure is directed, in general, to sorting machines and methods, with particular application to postal processing systems.

BACKGROUND OF THE DISCLOSURE

Improved postal processing and other systems are desirable.

SUMMARY OF THE DISCLOSURE

Various disclosed embodiments include a system and method. A method performed by a mail sorter includes receiving a plurality of mailpieces in the sorter. The method includes performing a buffered sort process by transporting the mailpieces along a plurality of transport lanes, each transport lane having an output tray and a buffer, to respective buffers and output trays on the transport lanes, but not transporting mailpieces to a buffer and an output tray on a selected transport lane. The method includes transporting mailpieces from the buffer to the output tray on the selected transport lane during the buffered sort process. The method includes selecting a new selected transport lane of the plurality of transport lanes. The method includes repeating the buffered sort process and the transporting mailpieces from the buffer to the output tray on the selected transport lane.

Other embodiments include a mail sorter configured to perform processes described herein. In some embodiments, the mail sorter includes at least one sort control unit. The mail sorter includes a plurality of transport lanes each having an output tray and at least one buffer, the sort control unit connected to control the transport lanes and the buffers and to direct mailpieces from an input tray along the transport lanes to respective output trays and buffers. The mail sorter is configured to receive a plurality of mailpieces at the input tray. The mail sorter is configured to perform a buffered sort process by transporting the mailpieces along the plurality of transport lanes to respective buffers and output trays on the transport lanes, but not transport mailpieces to a buffer and an output tray on a selected transport lane. The mail sorter is configured to transport mailpieces from the buffer to the output tray on the selected transport lane during the buffered sort process. The mail sorter is configured to select a new selected transport lane of the plurality of transport lanes, and repeat the buffered sort process and the transporting mailpieces from the buffer to the output tray on the selected transport lane.

Other embodiments include a non-transitory computer readable medium having program instructions stored thereon executable by one or more processors to control the operation of a mail sorter. The mail sorter has at least one sort control unit and a plurality of transport lanes each having an output tray and at least one buffer. The sort control unit is connected to control the transport lanes and the buffers and to direct mailpieces from an input tray along the transport lanes to respective output trays and buffers. The instructions cause the mail sorter to receive a plurality of mailpieces at the input tray and perform a buffered sort process by transporting the mailpieces along the plurality of transport lanes to respective buffers and output trays on the transport lanes, but not transport mailpieces to a buffer and an output tray on a selected transport lane. The instructions cause the mail sorter to transport mailpieces from the buffer to the output tray on the selected transport lane during the buffered sort process. The instructions cause the mail sorter to select a new selected transport lane of the plurality of transport lanes. The instructions cause the mail sorter to repeat the buffered sort process and the transporting mailpieces from the buffer to the output tray on the selected transport lane The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Various embodiments include an apparatus and a method for increasing the number of sort destinations that can be sorted with a two-pass radix sort without increasing the number of destination bins is described here. The method includes a modified radix sort plan. An initial, first sort pass can be performed in a typical radix sort manner. A second pass then involves storing a subset of the mail temporarily after feeding to ensure proper sequence at the output bin.

Currently, sequencing letters or other mailpieces or items involves a two-pass radix sort on a letter sorting machine. The number of destinations or delivery points that a machine can sort to is limited by the number of output bins in the machine. One aspect of a conventional two-pass radix sort is that the maximum number of output destinations is equal to the number of first-pass output bins times the number of second-pass output bins. Therefore, a 200 bin machine could process mail to 40,000 sort destinations, assuming all bins are used for both passes. The current trend in mail sorting is that the number of sort destinations is increasing while the volume of mail is decreasing. Therefore, the number of machines required to sort the mail is increasing while the amount of mail sorted on each machine is decreasing.

In a conventional radix sort, all of the mail that will be the first piece in any output bin on a second pass is sorted to a single bin on a first pass. Likewise, all of the pieces that go to the second delivery point in any second pass bin are sorted to another single bin on first pass. Then on second pass, the first pass output is sorted in order; e.g., first delivery points, then second delivery points, etc.

Figure 1:
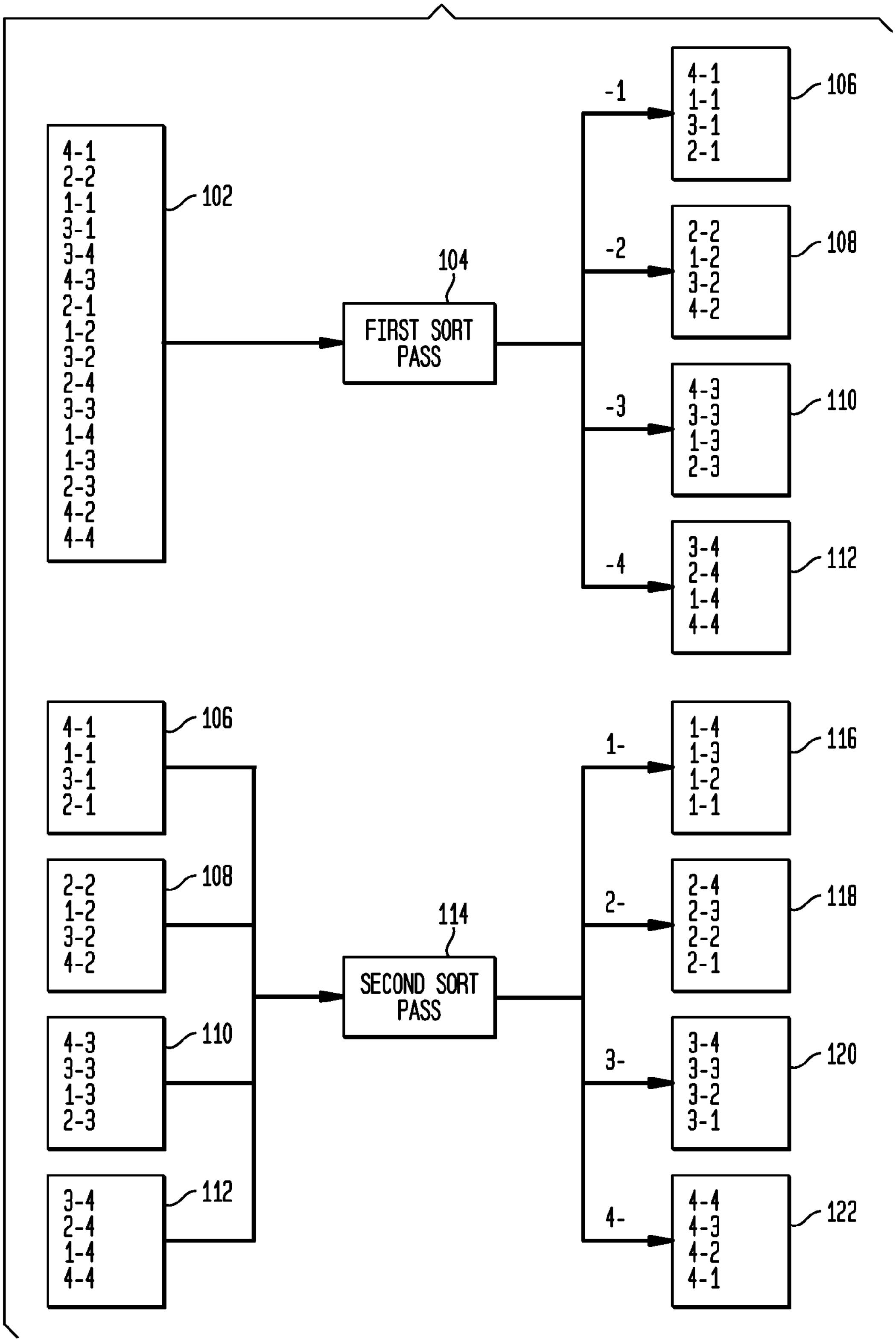
FIG. 1 depicts an example of a sort process.

FIG. 1 depicts an example of a sort process. Note that while two "sorters" are shown here, both passes can be performed by the same sorter. For purposes of this illustration, the items are labeled to show the sort criteria in the form "X-Y", where Y is the first sort criteria and X is the second sort criteria. In a least-significant-bit radix sort, for example, items numbered with the format 000XY would sort first on the "Y" digit, accumulate the results of that sort in order, and then sort those on the "X" digit. The results would be the elements in order according to the XY digits.

In a postal processing example, the mail pieces will typically have already been identified and are processed according to such criteria as delivery routes and delivery points along each of those routes. In this example, using such an "X-Y" designator for the sort criteria, the "X" may indicate a delivery route, and the "Y" may indicate the order of the delivery points on that route. So after sorting, the "2-1" mailpiece(s)—directed to the first ("1") delivery point on the "2" route—should come before the "2-3" mailpiece(s), which are destined for the third ("3") delivery point on the "2" route.

In FIG. 1, an initial mail tray 102 includes unsorted mailpieces that have been designated, using techniques known to those of skill in the art, to be sorted to specific delivery routes and delivery points on each of those routes.

The mailpieces from the initial tray 102 go through a first sort pass, using a conventional mail sorter in this example, to sort them first by delivery points (the "Y" value). The mail is sorted into trays (or bins, shelves, or other known storage devices, all referred to herein as "trays"). Tray 106 receives all the mailpieces for a first delivery point on any delivery route (indicated by the "-1"), tray 108 receives all the mailpieces for a second delivery point on any delivery route (indicated by the "-2"), tray 110 receives all the mailpieces for a third delivery point on any delivery route (indicated by the "-3"), and tray 112 receives all the mailpieces for a fourth delivery point on any delivery route (indicated by the "-4"). The mailpieces in each tray are not yet sorted by route.

The mailpieces from the first pass 104 are then sorted on a second pass 114 to sort them by delivery routes (the "X" value). Each of the trays 106-112 are fed into the second sort pass 114 in order, and are sorted into trays based on the delivery route. Tray 116 receives all the mailpieces for a first delivery route (indicated by the "1-"), tray 118 receives all the mailpieces for a second delivery route (indicated by the "2-"), tray 120 receives all the mailpieces for a third delivery route (indicated by the "3-"), and tray 122 receives all the mailpieces for a fourth route (indicated by the "4-").

Because each of the trays 106-112 was already segregated by delivery points, the second sort pass, sorting by delivery route, results in trays 116-122 each having all mailpieces sorted in delivery point order, where each tray contains a delivery route.

Note that this technique is limited in the number of potential delivery points/routes based on the number of trays handled by the sorter.

To keep up with delivery point growth, various embodiments disclosed herein include a sorter apparatus that can store multiple destinations within a single bin on the first pass. For example, the sorter can combine the first and second delivery points in all second pass bins to be sorted to a single bin in the first pass. This doubles the number of delivery points to which the machine can sort. Disclosed embodiments include a mechanism to ensure that the first delivery point pieces reach the second pass bin before the second delivery point pieces do.

Various embodiments include an apparatus using a modified radix sort that allows this first pass combination of delivery points per bin and the subsequent second pass buffering, but does not require a complicated transport lane. Instead, each transport lane (or tier on a destination bar code sorter (DCBS)) can include one or more dedicated buffer(s).

The example below illustrates one possible application of a process in accordance with disclosed embodiments. In this case, a "last-in, first-out" or LIFO buffer is used. This means that the last mail piece put into the buffer will be the first piece fed from the buffer. The notation used in this example for the sort criteria is X-Y where X is the lane number (which can correspond to a delivery route) and Y is the position in the pocket for any output tray on that transport lane. Of course, in some implementations, these may still correspond to delivery routes and delivery points.

Various embodiments provide that on the second pass, some or all of the second-delivery-point pieces are buffered while the first-delivery-point pieces are sorted to their respective bins. Then, the second-delivery-point pieces are sorted to their respective bins from the buffer before the third delivery point pieces are fed. This approach is not preferred since multiple buffers are required and each is required to access multiple parallel transport paths, as in the case with current DBCS machines. The transport path to accomplish this requires a large amount of footprint and cost.

The first pass sort plan is modified so that only one delivery point from each lane is sorted directly to the output bin on the second pass. Another delivery point (or multiple delivery points) are instead sorted to a buffer on the corresponding transport lane. This sort also allows the buffers to be emptied in parallel with feeding from the feeder during the second pass. This means that machine throughput is not degraded compared with current operations, while the number of possible sort destinations is increased dramatically.

In a process in accordance with disclosed embodiments, the first sort pass sorts the mailpieces in a standard (non-buffered) fashion, but a specialized sort process dictates the contents of each output tray to facilitate the second sort pass. The first-pass sort process is planned so that buffered mail on second pass is fed from the buffer in delivery point order, starting with the next delivery point in the sequence on the particular transport lane.

In an example described in more detail below, all first pass output trays contain mail designated for two different delivery points (DPs) for each active lane. These two delivery points will be described as the sequential DP and the buffered DP. This can be contrasted with a traditional sort, in which each output tray on the first pass only receives the sequential DP. That is, an output tray in a conventional first sort would contain all first DPs, or all second DPs, etc.

For purposes of the example below, assume that each first pass output tray has the following properties.

Tray Properties: The Tray number ($T_{Num}$) indicates the sequence order that the tray will be fed on second pass. Tray 1 will be fed first on second pass, etc.

Selected Lane ($L_{sel}$) indicates the lane that will be feeding from the buffer on second pass while this tray is being fed from the feeder. This tray will contain no mail for the Selected Lane.

Sequential DPs ($DP_{seq}$) are designated by X-Y, where X represents the second pass destination lane for the mail pieces and Y represents the sequence in that lane (the DP number). Each tray will contain one Sequential DP for each lane except the "Selected Lane".

Buffered DPs ($DP_{buf}$) are designated by X-Z, where X represents the second pass destination lane for the mail pieces and Z represents the sequence in that lane (the DP number).

In the example below, a tray will contain mail for one Buffered DP for each lane except the "Selected Lane" ($L_{sel}$); mail destined for the Buffered DP will be sorted to the respective lane's buffer on the second pass, before going to the output tray.

$L_{tot}$ refers to the total number of output Lanes on second pass (4 in the example case below), and Cycle (n) refers to the number of times through round robin of "selected lanes" in the trays before this one.

For each tray, the current cycle (n) is calculated as:

$$n = \frac{(T_{Num} - 2)}{L_{tot}}$$

where integer division is used for this calculation, and $$L_{sel} T_{Num} - (n * L_{tot}) - 1$$

Note that this is 0 for first tray, which does not have a "Selected Lane". All other lanes will be between 1 and $L_{tot}$. For all lanes except $L_{sel}$, $DP_{seq}$=X-Y where X=Lane Number and Y=highest DP number fed for this lane in all previous trays +1, if this lane was the selected lane on the previous tray (buffer should be empty when this tray is fed on second pass); and Y=$Y_{prev}$+1 where $Y_{prev}$ is the Y value for this lane in the previous tray in all other cases.

$DP_{buf}$=X-Z where X=Lane Number and

Z=Y+2*$L_{tot}$−3, if this lane was the selected lane on the previous tray (buffer should be empty when this tray is fed on second pass); and Z=$Z_{prev}$−1 where $Z_{prev}$ is the Z value for this lane in the previous tray, in all other cases.

Note that first tray is a special case. For this tray, Y=1 and Z=2*Lane Number. Since there is no selected lanes for this tray, all lanes are included.

These lane assignments apply to a system with one buffer per transport lane, as described in the example below. Those of skill in the art will recognize that the techniques described herein can be expanded to systems with multiple buffers in each lane.

According to disclosed embodiments, one or more of the transport lanes to the respective output trays has one or more buffers. For simplicity of description, the examples below discuss each transport lane having one or more buffers, but of course other implementations may omit buffers for one or more transport lanes. The buffers can temporarily store mailpieces as they travel in the transport lane. Mailpieces on the transport lane can be selectively sent to the buffer based on their sort criteria, and the buffers can then be emptied back unto the transport lane. In the example below, the buffers are last-in-first-out (LIFO) buffers, but other implementations can use first-in-first-out (FIFO) buffers.

Each mailpiece can be processed to recognize its destination address or to assign it a unique identifier. Each mailpiece can be marked or labeled with an indicia such as a barcode or otherwise. The indicia on each mailpiece can be used for the sorting processes described herein, so that each mailpiece can be associated with the sort criteria described herein, and each unique sort criteria can conversely be associated with multiple mailpieces.

In the second sort pass, in accordance with disclosed embodiments, at any given time, one buffer will be feeding mail to its dedicated transport lane. At the same time, the feeder will be feeding mail to the other transport lanes and their respective buffers.

The active buffer (the buffer that is feeding mail) is cycled between buffers from the different transport lanes. The active buffer and the first-pass mail group from the feeder are kept synchronized so that feeder does not feed mail to the active buffer.

The contents of the trays represent the output of the first sort pass and are the input to second pass. Tray content, in any given tray, is in random order, but is limited to the defined sort criteria.

Notice that the first-pass output is not merely one (or more) particular delivery point for all bins. Instead, the first pass sort scheme plans for one lane to be feeding from the buffer while a particular tray is being fed from the feeder.

Notice also that the delivery point sequence is established at the stacker bin.

Figure 2:
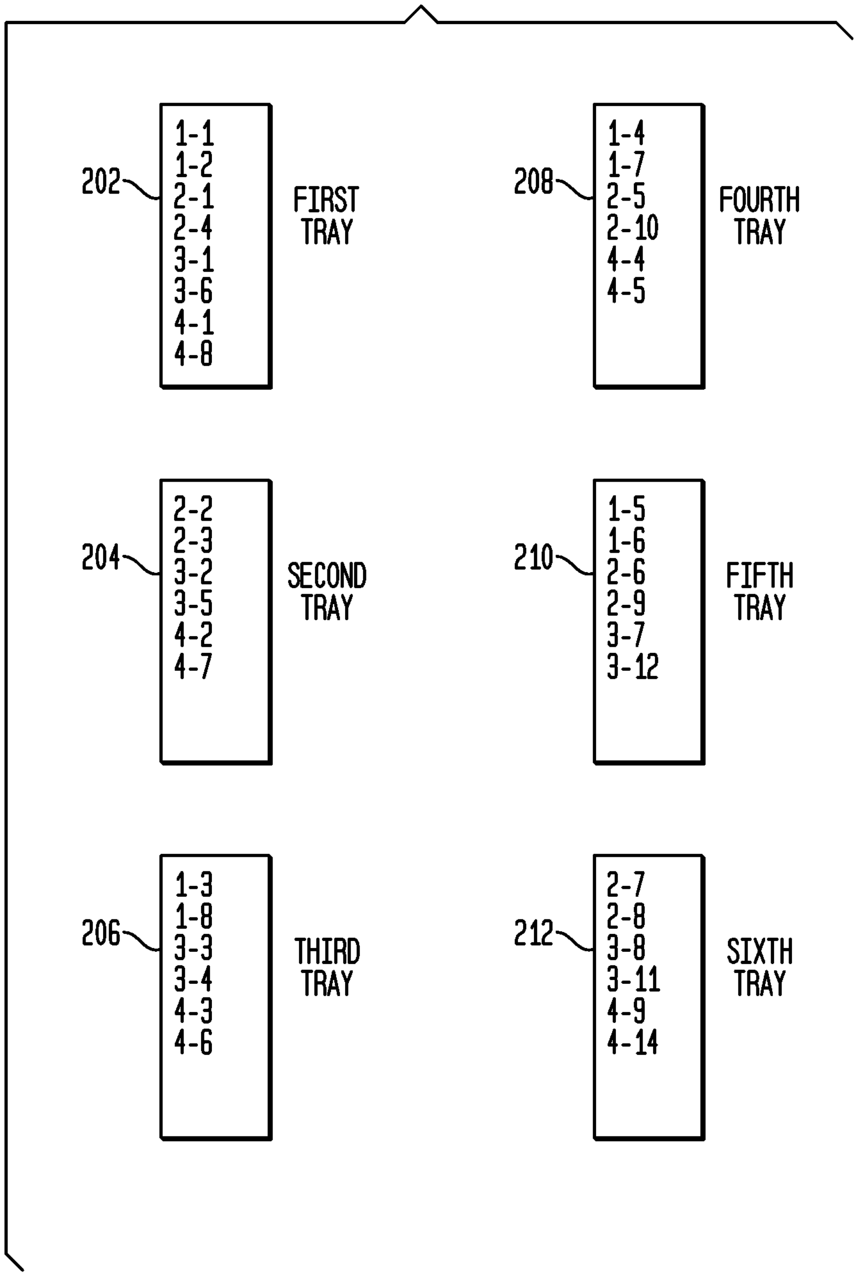
FIG. 2 illustrates an example of the contents of trays at the output of a first sort process, in accordance with disclosed embodiments.

FIG. 2 illustrates an example of the contents of trays at the output of the first sort process, which can be performed in a conventional manner using the specialized sort process described above. These exemplary trays 202-212 are used to illustrate the second sort process as described below, and are used as the input to the second sort process. Note that not all possible X-Y combinations are shown; the system can determine during pre-processing which X-Y combinations are present among the mailpieces, and adjust the sort processes accordingly.

FIGS. 3A-3F illustrate an example of a second sort process in accordance with disclosed embodiments, as each of the exemplary trays 202-212 are feed into a sorter.

These figures show a simplified schematic diagram of a sorter 300, which can be a modified DCBS as described herein. In this figure, sorter 300 includes input tray 302, which feeds mailpieces to sort control 304. Sort control 304 includes a controller and sort mechanisms known to those of skill in the art, configured to act as described herein.

Sort control 304 is connected to transport mailpieces, after sorting, to a plurality of transport lanes 306. Note that while transport lanes 306 are shown schematically in this figure, those of skill in the art will recognize that any known transport mechanism can be used here, including pinch belts, conveyors, and other mechanisms configured to transport mailpieces as described herein.

Transport lanes 306 connect sort control 304 to a plurality of output trays 316/318/320/322, referred to as "dedicated" transport lanes. Transport lanes 306 also connect sort control 304 to a plurality of buffers 326/328/330/332, which are configured to receive and store mailpieces during sorting, referred to as "buffered" transport lanes. In this example, there are four output trays and four buffers, but more or less of each of these could be used in different implementations. Sort control 304 is also connected to control the buffers 326/328/330/332 to determine when they will feed directly to their respective output trays 316/318/320/322.

In this example, each output tray has a corresponding buffer. Buffer 326 is connected to feed to output tray 316; buffer 328 is connected to feed to output tray 318; buffer 330 is connected to feed to output tray 320; and buffer 332 is connected to feed to output tray 322. In these illustrations, "lower" mailpieces in each buffer or tray are the earlier-received mailpieces, and newer mailpieces are shown "stacked" on top of earlier ones. The buffers 326/328/330/332, in this example, are LIFO buffers. In these figures, bold lines show active transport lanes, while dotted lines show inactive transport lanes.

Figure 3A:
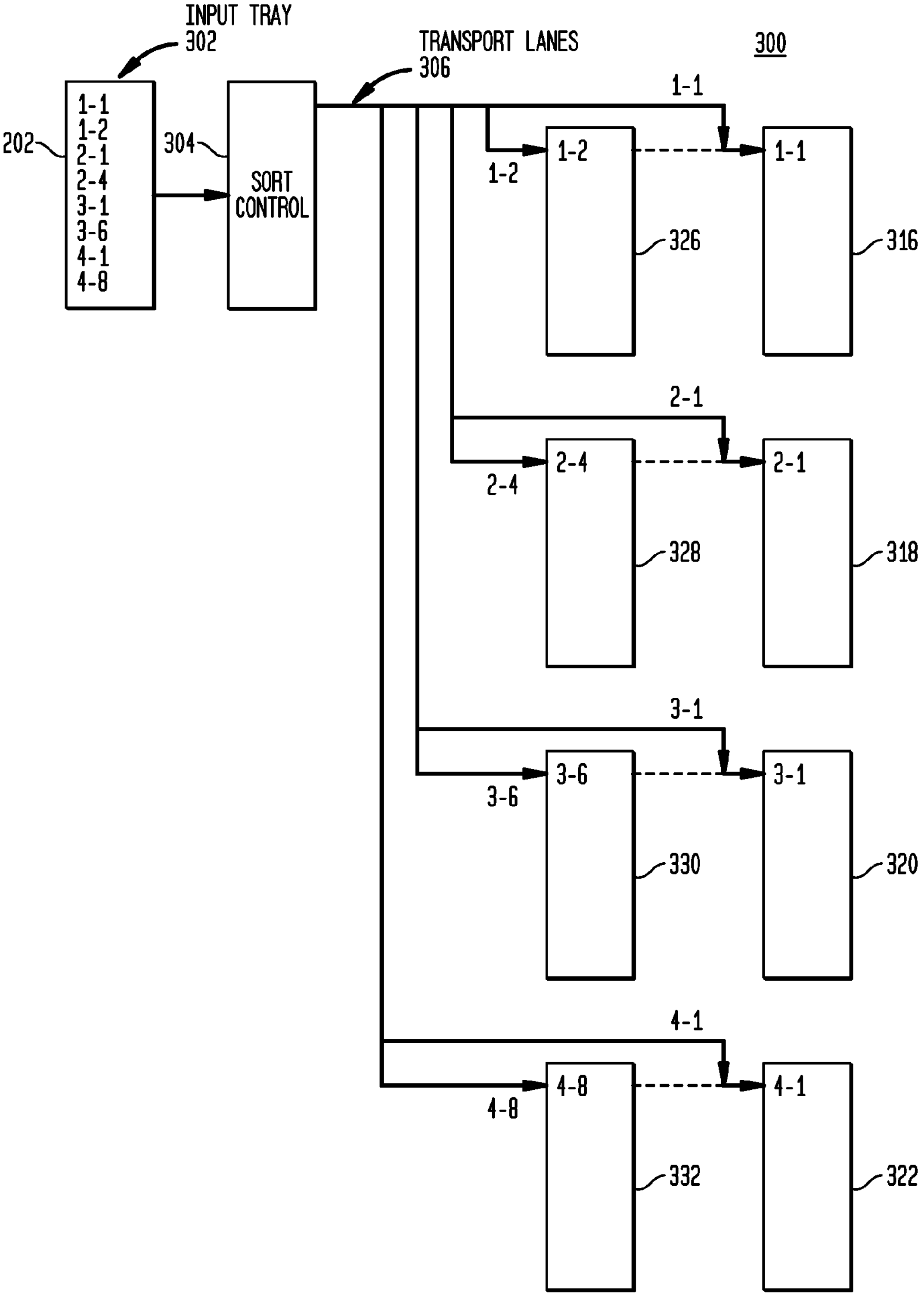
FIGS. 3A-3F illustrate an example of a second sort process in accordance with disclosed embodiments.

FIG. 3A shows the second-pass sort of the mailpieces in the first tray 202, which is the current input tray 302. At this point, buffers 326/328/330/332 and respective output trays 316/318/320/322 are empty. Input tray 302 feeds the mailpieces to sort control 304, which sorts them and transports them using transport lanes 306 to the respective buffers and output trays as described below.

In FIG. 3A, mail pieces 1-1 are fed directly to output tray 316 using a dedicated transport lane, and mail pieces 1-2 are fed to buffer 326 using a buffered transport lane; these together are referred to as lane 1. Mail pieces 2-1 are fed directly to output tray 318 using a dedicated transport lane, and mail pieces 2-4 are fed to buffer 328 using a buffered transport lane; these together are referred to as lane 2. Mail pieces 3-1 are fed directly to output tray 320 using a dedicated transport lane, and mail pieces 3-6 are fed to buffer 328 using a buffered transport lane; these together are referred to as lane 3. Mail pieces 4-1 are fed directly to output tray 322 using a dedicated transport lane, and mail pieces 4-8 are fed to buffer 332 using a buffered transport lane; these together are referred to as lane 4.

Note that the first tray 202 is planned to have first-delivery-point mail pieces that can be transported directly to the respective output trays to be first in those trays.

Figure 3B:
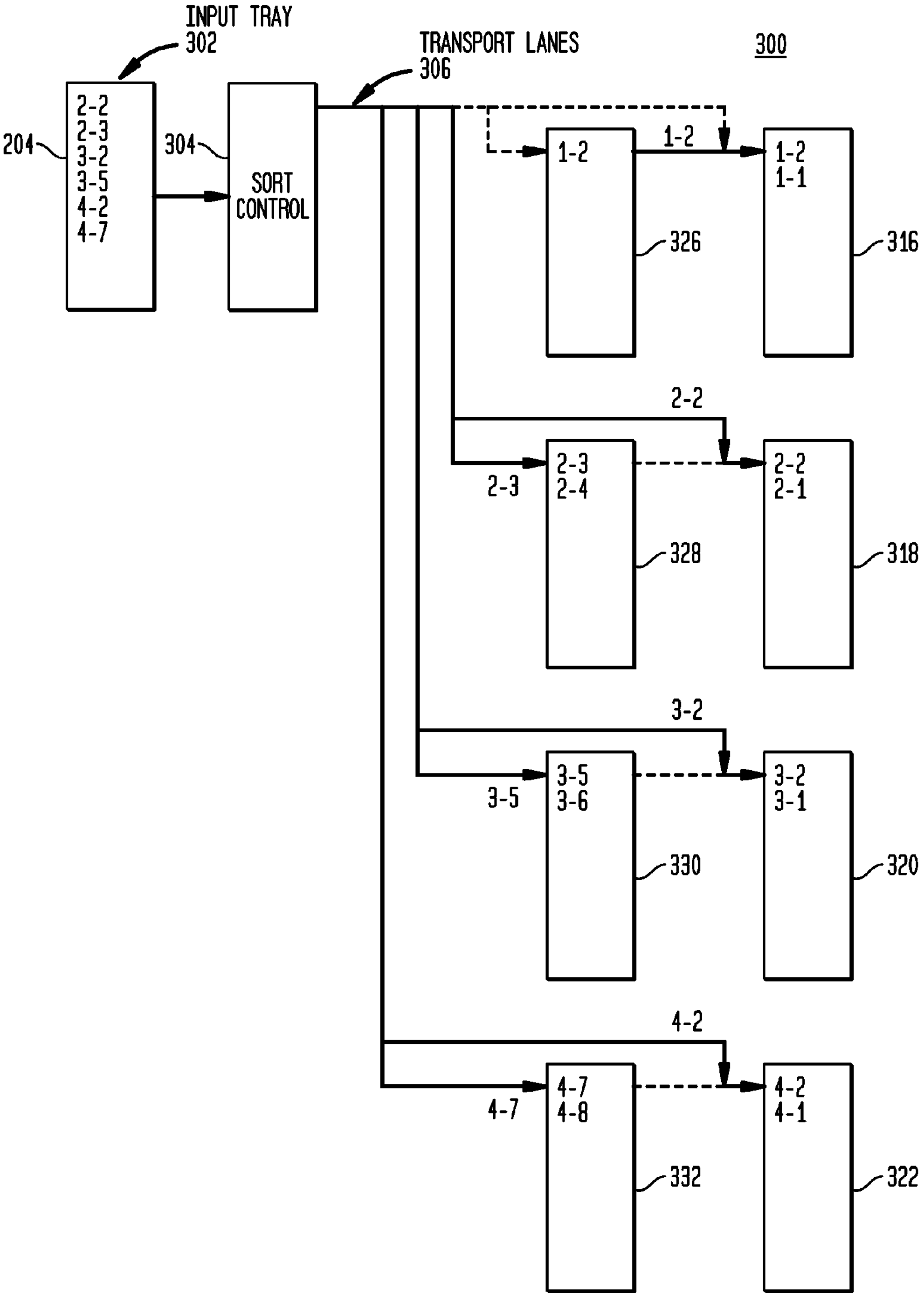

FIG. 3B shows the second-pass sort of the mailpieces in the second tray 204, which is the current input tray 302. At this point, buffers 326/328/330/332 and respective output trays 316/318/320/322 store the mailpieces from the previous input tray(s). Input tray 302 feeds the mailpieces to sort control 304, which sorts them and transports them using transport lanes 306 to the respective buffers and output trays as described below.

In FIG. 3B, mail pieces 2-2 are fed directly to output tray 318 using a dedicated transport lane, and mail pieces 2-3 are fed to buffer 328 using a buffered transport lane. Mail pieces 3-2 are fed directly to output tray 320 using a dedicated transport lane, and mail pieces 3-5 are fed to buffer 328 using a buffered transport lane. Mail pieces 4-2 are fed directly to output tray 322 using a dedicated transport lane, and mail pieces 4-7 are fed to buffer 332 using a buffered transport lane.

In this portion of the process, note that sort control does not feed to output tray 316 or buffer 326, and the first sort pass was programmed so that there are no mailpieces for lane 1. Instead, buffer 326 directly feeds mailpieces 1-2 to output tray 316, emptying buffer 326. This occurs at the same time that the other buffers and output trays are being filled.

Figure 3C:
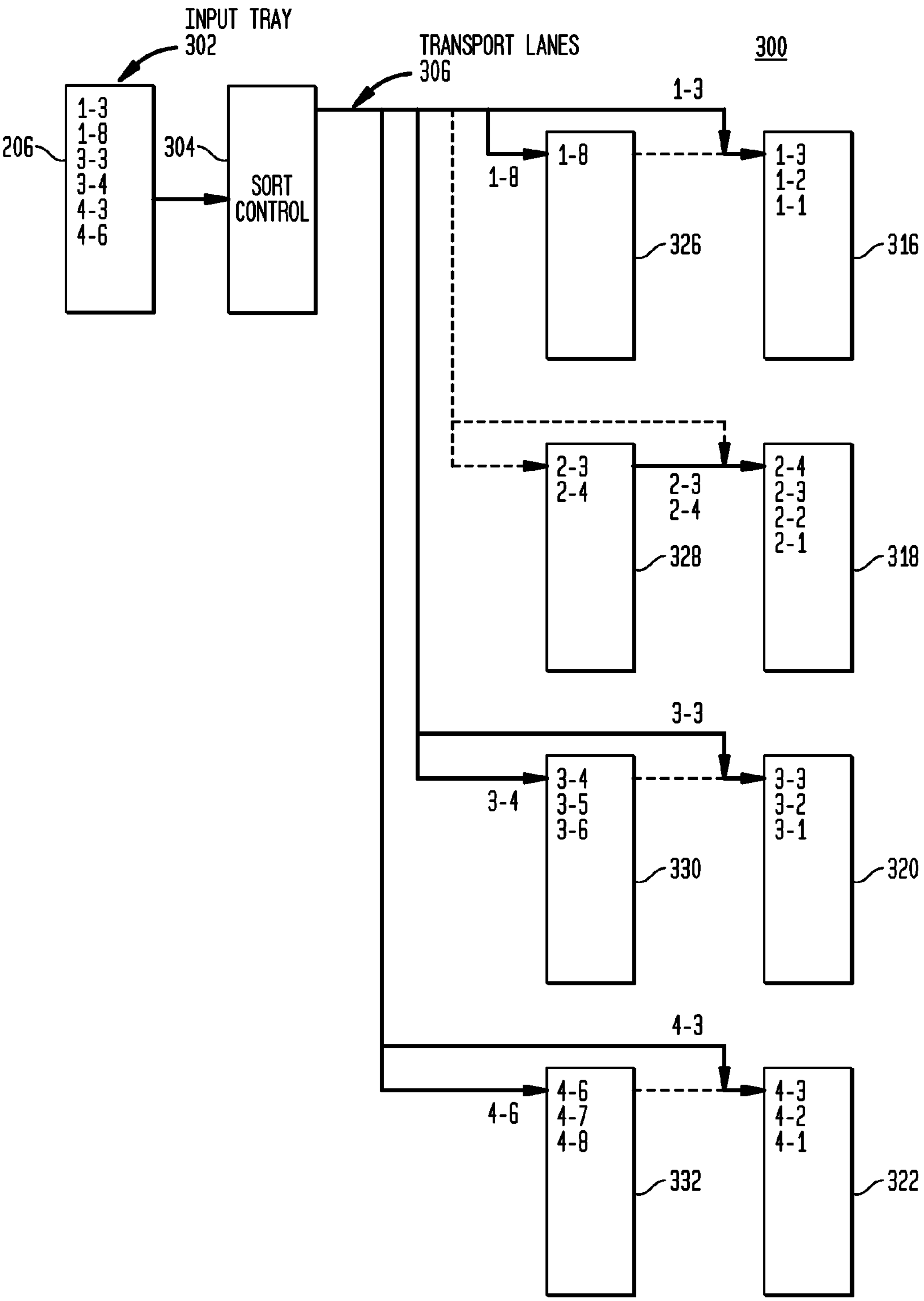

FIG. 3C shows the second-pass sort of the mailpieces in the third tray 206, which is the current input tray 302. At this point, buffers 326/328/330/332 and respective output trays 316/318/320/322 store the mailpieces from the previous input tray(s). Input tray 302 feeds the mailpieces to sort control 304, which sorts them and transports them using transport lanes 306 to the respective buffers and output trays as described below.

In FIG. 3C, mail pieces 1-3 are fed directly to output tray 316 using a dedicated transport lane, and mail pieces 1-8 are fed to buffer 326 using a buffered transport lane. Mail pieces 3-3 are fed directly to output tray 320 using a dedicated transport lane, and mail pieces 3-4 are fed to buffer 330 using a buffered transport lane. Mail pieces 4-3 are fed directly to output tray 322 using a dedicated transport lane, and mail pieces 4-6 are fed to buffer 332 using a buffered transport lane.

In this portion of the process, note that sort control does not feed to output tray 318 or buffer 328, and the first sort pass was programmed so that there are no mailpieces for lane 2. Instead, buffer 328 directly feeds mailpieces 2-3 and 2-4, in that order, to output tray 318, emptying buffer 328. This occurs at the same time that the other buffers and output trays are being filled.

Figure 3D:
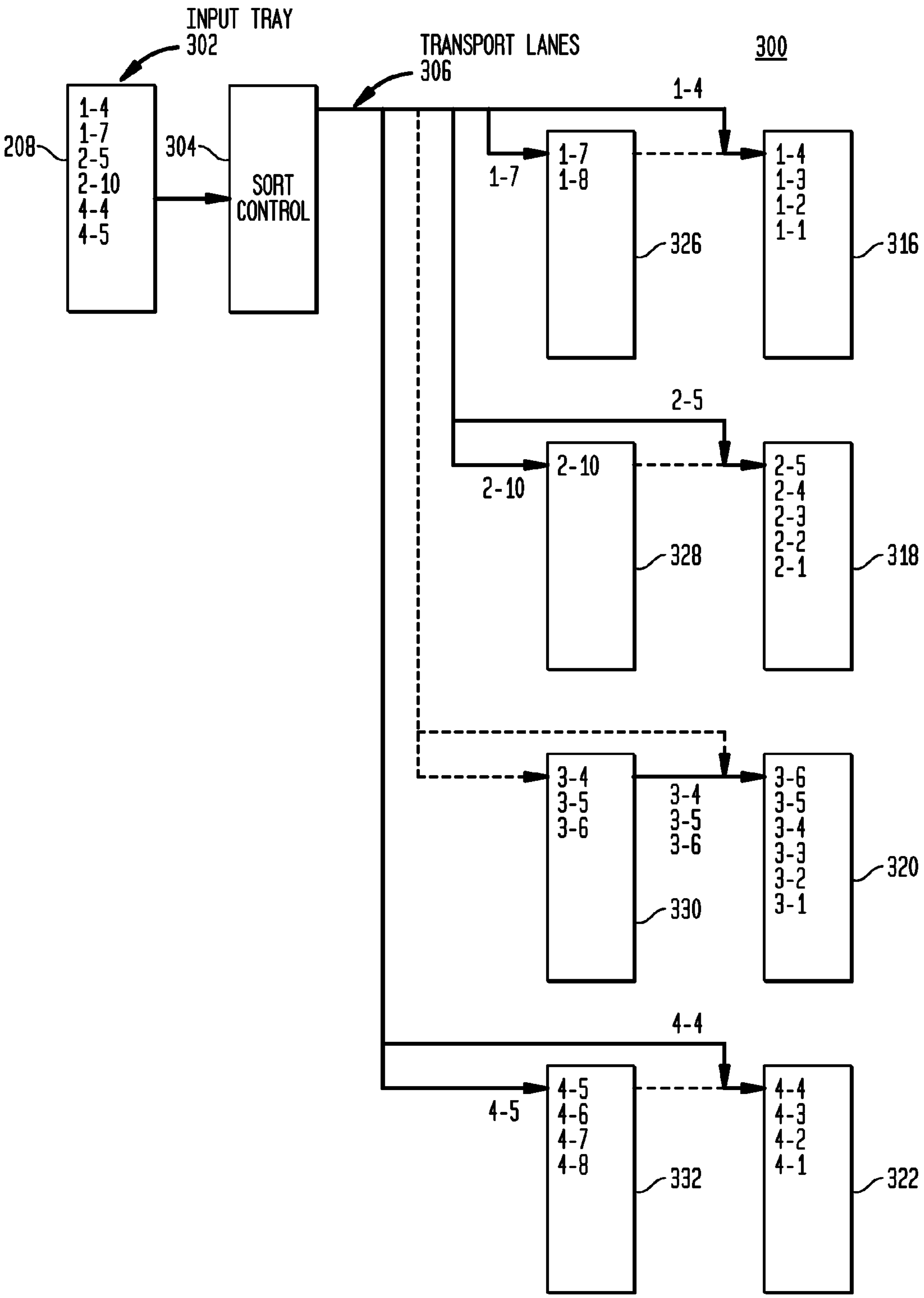

FIG. 3D shows the second-pass sort of the mailpieces in the fourth tray 208, which is the current input tray 302. At this point, buffers 326/328/330/332 and respective output trays 316/318/320/322 store the mailpieces from the previous input tray(s). Input tray 302 feeds the mailpieces to sort control 304, which sorts them and transports them using transport lanes 306 to the respective buffers and output trays as described below.

In FIG. 3D, mail pieces 1-4 are fed directly to output tray 316 using a dedicated transport lane, and mail pieces 1-7 are fed to buffer 326 using a buffered transport lane. Mail pieces 2-5 are fed directly to output tray 318 using a dedicated transport lane, and mail pieces 2-10 are fed to buffer 328 using a buffered transport lane. Mail pieces 4-4 are fed directly to output tray 322 using a dedicated transport lane, and mail pieces 4-5 are fed to buffer 332 using a buffered transport lane.

In this portion of the process, note that sort control does not feed to output tray 320 or buffer 330, and the first sort pass was programmed so that there are no mailpieces for lane 3. Instead, buffer 330 directly feeds mailpieces 3-4, 3-5, and

3-6, in that order, to output tray 320, emptying buffer 330. This occurs at the same time that the other buffers and output trays are being filled.

Figure 3E:
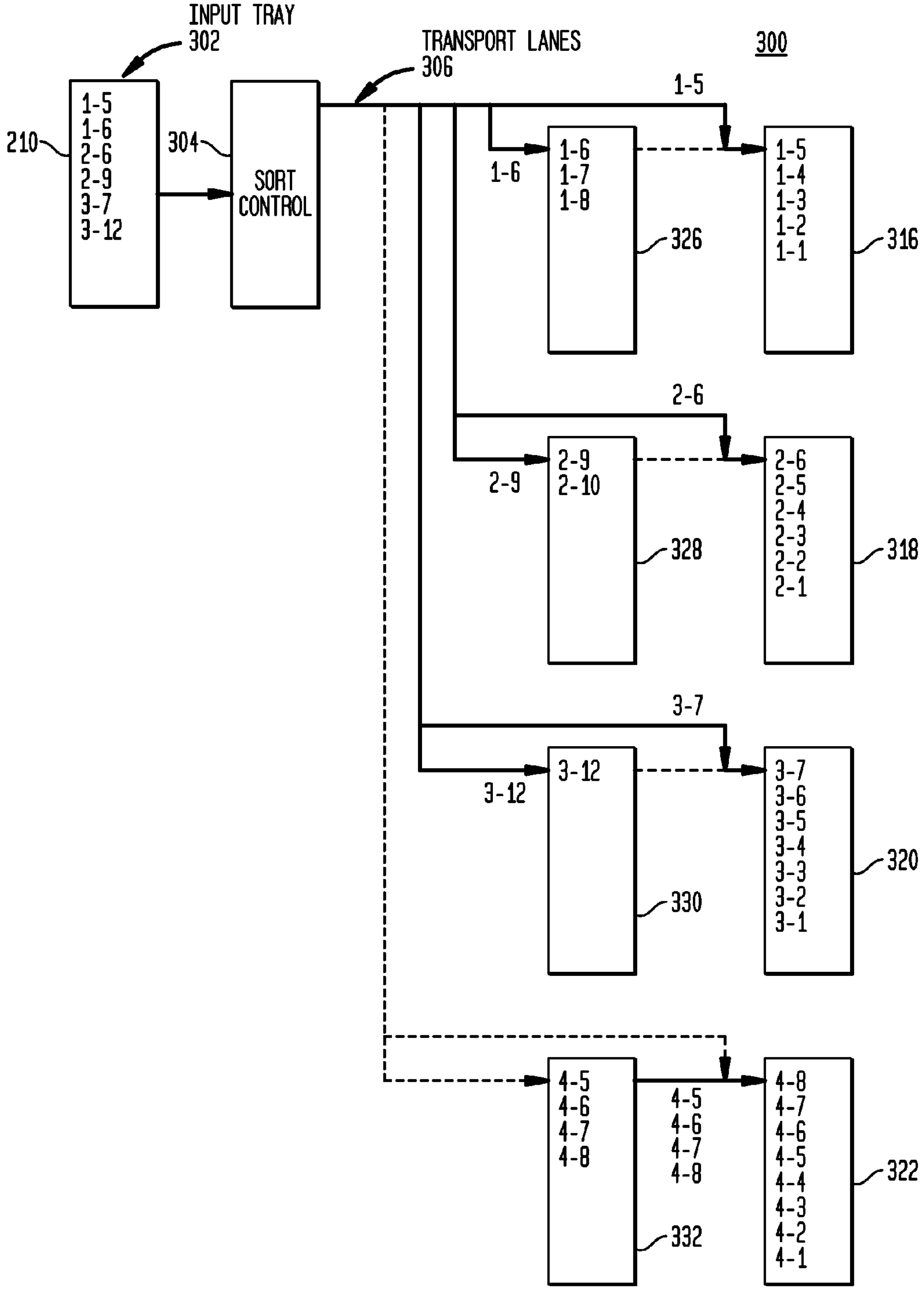

FIG. 3E shows the second-pass sort of the mailpieces in the fifth tray 210, which is the current input tray 302. At this point, buffers 326/328/330/332 and respective output trays 316/318/320/322 store the mailpieces from the previous input tray(s). Input tray 302 feeds the mailpieces to sort control 304, which sorts them and transports them using transport lanes 306 to the respective buffers and output trays as described below.

In FIG. 3E, mail pieces 1-5 are fed directly to output tray 316 using a dedicated transport lane, and mail pieces 1-6 are fed to buffer 326 using a buffered transport lane. Mail pieces 2-6 are fed directly to output tray 318 using a dedicated transport lane, and mail pieces 2-9 are fed to buffer 328 using a buffered transport lane. Mail pieces 3-7 are fed directly to output tray 320 using a dedicated transport lane, and mail pieces 3-12 are fed to buffer 330 using a buffered transport lane.

In this portion of the process, note that sort control does not feed to output tray 322 or buffer 332, and the first sort pass was programmed so that there are no mailpieces for lane 4. Instead, buffer 330 directly feeds mailpieces 4-5, 4-6, 4-7, and 4-8, in that order, to output tray 322, emptying buffer 332. This occurs at the same time that the other buffers and output trays are being filled.

Figure 3F:
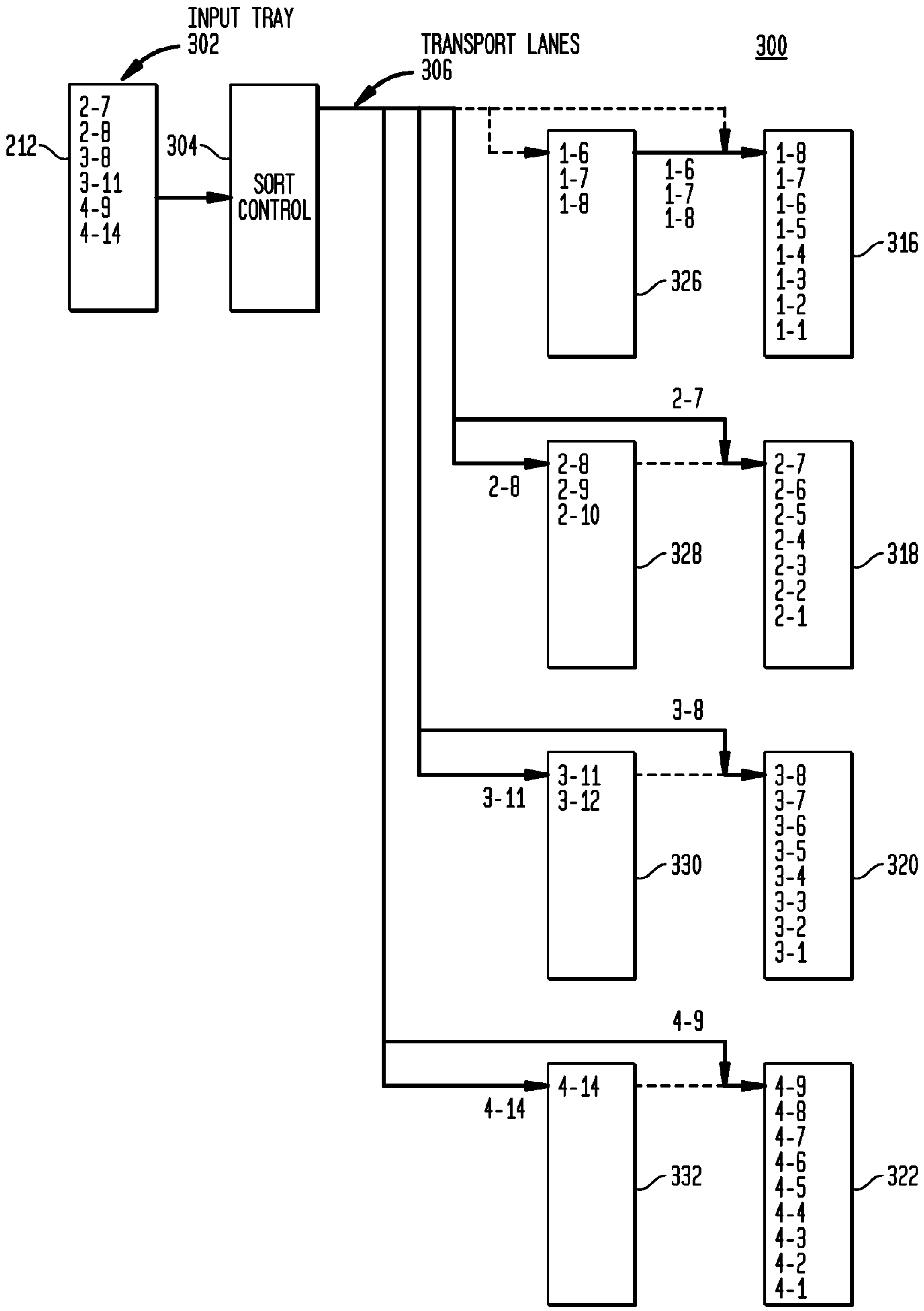

FIG. 3F shows the second-pass sort of the mailpieces in the sixth tray 212, which is the current input tray 302. At this point, buffers 326/328/330/332 and respective output trays 316/318/320/322 store the mailpieces from the previous input tray(s). Input tray 302 feeds the mailpieces to sort control 304, which sorts them and transports them using transport lanes 306 to the respective buffers and output trays as described below.

In FIG. 3F, mail pieces 2-7 are fed directly to output tray 318 using a dedicated transport lane, and mail pieces 2-8 are fed to buffer 328 using a buffered transport lane. Mail pieces 3-8 are fed directly to output tray 320 using a dedicated transport lane, and mail pieces 3-11 are fed to buffer 330 using a buffered transport lane. Mail pieces 4-9 are fed directly to output tray 322 using a dedicated transport lane, and mail pieces 4-14 are fed to buffer 332 using a buffered transport lane.

In this portion of the process, note that sort control does not feed to output tray 316 or buffer 326, and the first sort pass was programmed so that there are no mailpieces for lane 1. Instead, buffer 326 directly feeds mailpieces 1-6, 1-7, and 1-8, in that order, to output tray 316, emptying buffer 326. This occurs at the same time that the other buffers and output trays are being filled.

If there are no other trays from the first sort process, then the second sort process can end. To complete the second sort, all buffers still holding mail pieces are emptied in parallel into their respective output trays, in the same manner as above.

If there are other trays from the first sort process, of course, the process continues as described above until all trays have been fed to the second sort process.

The result is that the output trays in each lane include all the mailpieces for that lane sorted in the proper order. In contrast to known techniques, the number of ordered sets of mailpieces in each tray is greatly increased through the use of buffering. In the example described here, there were six trays used on first pass and four trays used on second pass. Conventional sorting would've allowed twenty four delivery points to be sequenced. In this example, however, thirty eight delivery points were sequenced. Therefore, this example improved the number of delivery points by 58%. Larger improvements may be realized by increasing the number of buffers on each lane.

Note that in some circumstances, a first sort pass is not required, for example when the number of individual X-Y sets of mailpieces is small. In such cases, using both the buffers and output trays allows a great number of sets to be properly processed than in systems without transport lane buffers.

For even higher number of sort destinations (delivery points), various embodiments also support multiple stages of buffers on each transport lane.

Figure 4:
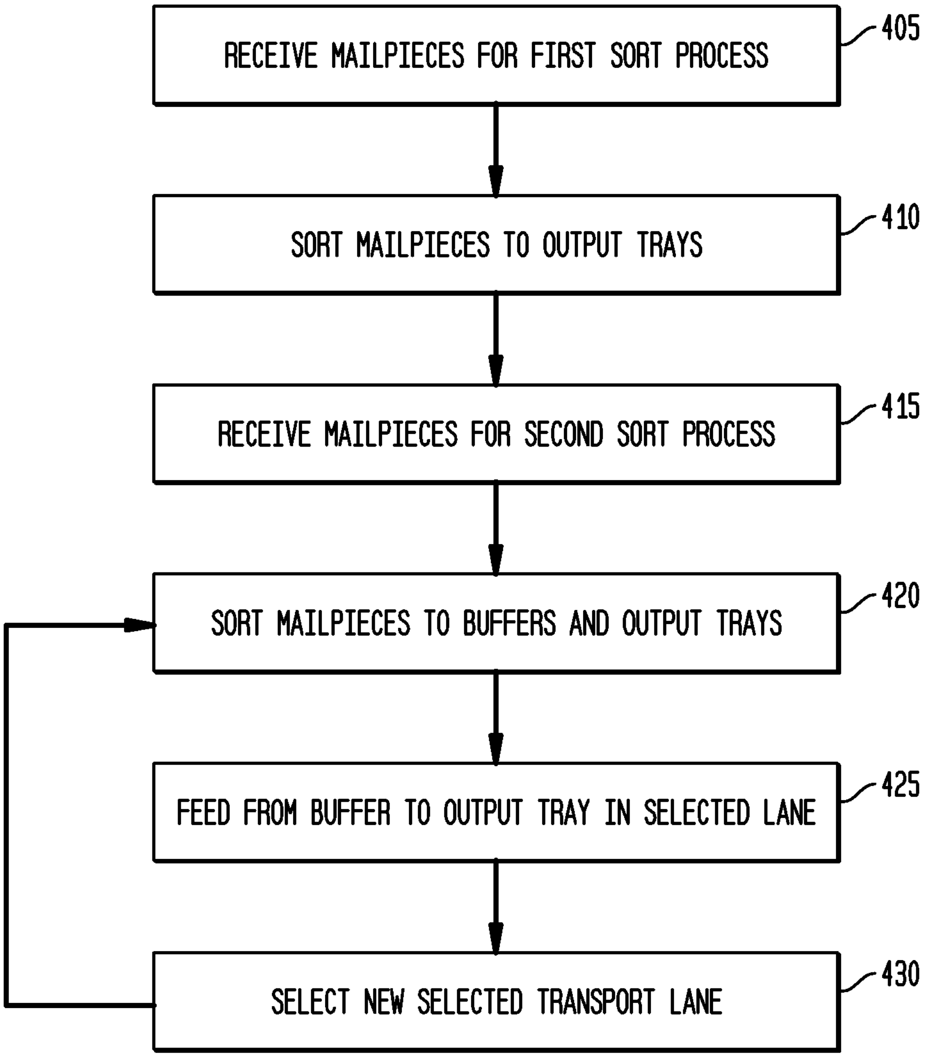
FIG. 4 depicts a flowchart of a process in accordance with disclosed embodiments.

FIG. 4 depicts a flowchart of a process that can be performed by a sorter, in accordance with disclosed embodiments. In some cases, the sorter is a modified destination bar code sorter configured to sort mailpieces.

The sorter receives a plurality of mailpieces for an initial sort process (step 405). Each of the mailpieces is directed to an output tray X in a set Y, where Y indicates the relative position of the mailpieces in the X output tray. The sorter has a plurality of transport lanes, each transport lane associated with at least one buffer and an output tray. Each mailpiece has an identifier associated with its X-Y destination, and can be marked with an indicia indicating its identifier.

The sorter sorts the mailpieces, in the initial sort process, into a plurality of output trays (step 410). The mailpieces can be transported to each output tray in accordance with the formula described above. To sort the mailpieces, the sorter transports each mailpiece on a transport lane to an output tray determined by the formula described above.

The sorter receives the mailpieces for a buffered sort process in the order of the respective output trays for the first sort process (step 415).

The sorter sorts the mailpieces, in the buffered sort process, by transporting each of the mailpieces to a respective buffer or output tray (step 420).

As part of the s buffered sort process, for each output tray of the first sort process, the sorter sorts the mailpieces into the respective buffers and output trays of a plurality of transport lanes not including a selected transport lane, and at the same time feeds mailpieces from the buffer to the output tray of the selected transport lane (step 425). This step can include selecting an initial selected transport lane.

The sorter selects a new selected transport lane (step 430).

The system repeats steps 420-430 multiple times, until all mailpieces have been transported into output bins.

Unless specifically described herein, no steps or components should be regarded as essential or necessary for inclusion in the claims below. Further, in various embodiments, the steps above can be performed concurrently, sequentially, or in a different order, unless specified otherwise.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a sorter, the method comprising:

receiving a plurality of mailpieces in an input of the sorter;

performing a buffered sort process by transporting the mailpieces along a plurality of transport lanes, wherein each transport lane has an input, a buffer, and an output tray, wherein the mailpieces are selectively transported from the input of each transport lane directly to the output tray on the transport lane, or the mailpieces are first transported to the respective buffer and then to the output tray of the transport lane, wherein the plurality of transport lanes comprise a selected transport lane, wherein the mailpieces are not transported from the input to the output tray on the selected transport lane, and wherein during the buffered sort process, the mailpieces are transported from the buffer to the output tray on the selected transport lane;

selecting a new selected transport lane of the plurality of transport lanes; and repeating the buffered sort process and transporting the mailpieces from the buffer to the output tray on the new selected transport lane.

2. The method of claim 1, wherein, during each iteration of the buffered sort process, a different lane is selected and the buffer for the selected lane is emptied to the output tray of the selected lane.

3. The method of claim 1, wherein each mailpiece has an identifier associated with an X-Y destination of that mailpiece, the X-Y destination indicating a position in a set Y of output tray X.

4. The method of claim 3, further comprising an initial sort process that sorts the mailpieces into a plurality of initial output trays for feeding to the buffered sort process.

5. The method of claim 4, wherein the selected transport lane is determined according to the formula $L_{sel}=T_{Num}-(n*L_{tot})-1$, where $$n = \frac{(T_{Num} - 2)}{L_{tot}},$$

$T_{Num}$ indicates the sequence order that the tray will be fed on a second pass, $L_{sel}$ indicates the selected lane, and $L_{tot}$ refers to the total number of output Lanes on the second pass.

6. The method of claim 1, further comprising selecting an initial selected transport lane.

7. The method of claim 1, wherein the buffers are last-in-first-out buffers.

8. A mail sorter, comprising:

at least one sort control unit;

a plurality of transport lanes each having an input tray, an output tray and at least one buffer, the sort control unit connected to control each of the plurality of transport lanes and the at least one buffer, and to direct mailpieces from an input tray along the transport lanes to the respective output trays and buffers, wherein the mail sorter is configured to:

receive a plurality of mailpieces at the input tray;

perform a buffered sort process by transporting the mailpieces along a plurality of transport lanes, wherein each transport lane has an output tray and a buffer, wherein the mailpieces are selectively transported from the input of each transport lane directly to the output tray on the transport lane, or the mailpieces are first transported to the respective buffer and then to the output trap of the transport lane, wherein the plurality of transport lanes comprise a selected transport lane, wherein the mailpieces are not transported from the input try to the output tray on the selected transport lane, wherein during the buffered sort process, the mailpieces are transported from the buffer to the output tray on the selected transport lane, and wherein said control unit further selects a new selected transport lane of the plurality of transport lanes, and repeat the buffered sort process and the transporting mailpieces from the buffer to the output tray on the new selected transport lane.

9. The mail sorter of claim 8, wherein, during each iteration of the buffered sort process, a different lane is selected and the buffer for the selected lane is emptied to the output tray of the selected lane.

10. The mail sorter of claim 8, wherein each mailpiece has an identifier associated with an X-Y destination of that mailpiece, the X-Y destination indicating a position in a set Y of output tray X.

11. The mail sorter of claim 10, further comprising an initial sort process that sorts the mailpieces into a plurality of initial output trays for feeding to the buffered sort process.

12. The mail sorter of claim 11, wherein the selected transport lane is determined according to the formula $L_{sel}=T_{Num}-(n*L_{tot})-1$, where $$n = \frac{(T_{Num} - 2)}{L_{tot}},$$

$T_{Num}$ indicates the sequence order that the tray will be fed on a second pass, $L_{sel}$ indicates the selected lane, and $L_{tot}$ refers to the total number of output Lanes on the second pass.

13. The mail sorter of claim 8, wherein the sorter is also configured to select an initial selected transport lane.

14. The mail sorter of claim 8, wherein the buffers are last-in-first-out buffers.

15. A non-transitory computer readable medium having program instructions stored thereon executable by one or more processors to control the operation of a mail sorter, the mail sorter having:

at least one sort control unit; and a plurality of transport lanes each having an output tray and at least one buffer, wherein the sort control unit is configured to control each of the plurality of transport lanes and the buffers, and to direct mailpieces from an input tray along the transport lanes to respective output trays and buffers, and wherein the instructions cause the mail sorter to:

receive a plurality of mailpieces at the input tray;

perform a buffered sort process by transporting the mailpieces along a plurality of transport lanes, wherein each transport lane has an output tray and a buffer, wherein the mailpieces are selectively transported from the input of each transport lane directly to the output tray of the transport lane, or the mailpieces are first transported to the respective buffer and then to the output tray of the transport lane, wherein the plurality of transport lanes comprise a selected transport lane, wherein the mailpieces are not transported from the input tray to the output tray on the selected transport lane, wherein during the buffered sort process, the mailpieces are transported from the buffer to the output tray on the selected transport lane, and wherein said control unit further selects a new selected transport lane of the plurality of transport lanes; and repeat the buffered sort process and the transporting mailpieces from the buffer to the output tray on the new selected transport lane.

16. The computer-readable medium of claim 15, wherein, during each iteration of the buffered sort process, a different lane is selected and the buffer for the selected lane is emptied to the output tray of the selected lane.

17. The computer-readable medium of claim 15, wherein each mailpiece has an identifier associated with an X-Y destination of that mailpiece, the X-Y destination indicating a position in a set Y of output tray X.

18. The computer-readable medium of claim 15, wherein the instructions also cause the mail sorter to perform an initial sort process that sorts the mailpieces into a plurality of initial output trays for feeding to the buffered sort process.

19. The computer-readable medium of claim 15, wherein the selected transport lane is determined according to the formula $L_{sel}=T_{Num}-(n*L_{tot})-1$, where $$n = \frac{(T_{Num} - 2)}{L_{tot}},$$

$T_{Num}$ indicates the sequence order that the tray will be fed on a second pass, $L_{sel}$ indicates the selected lane, and $L_{tot}$ refers to the total number of output Lanes on the second pass.

20. The computer-readable medium of claim 15, wherein the instructions also cause the mail sorter to select an initial selected transport lane.

* * * * *